Aug. 11, 1964     P. H. REARDON     3,143,988
APPARATUS FOR MAKING ROLLED EDGE METAL CONTAINERS
Original Filed Sept. 29, 1959     7 Sheets-Sheet 1

INVENTOR
Patrick H. Reardon
BY Stevens, Davis, Miller & Mosher
ATTORNEYS

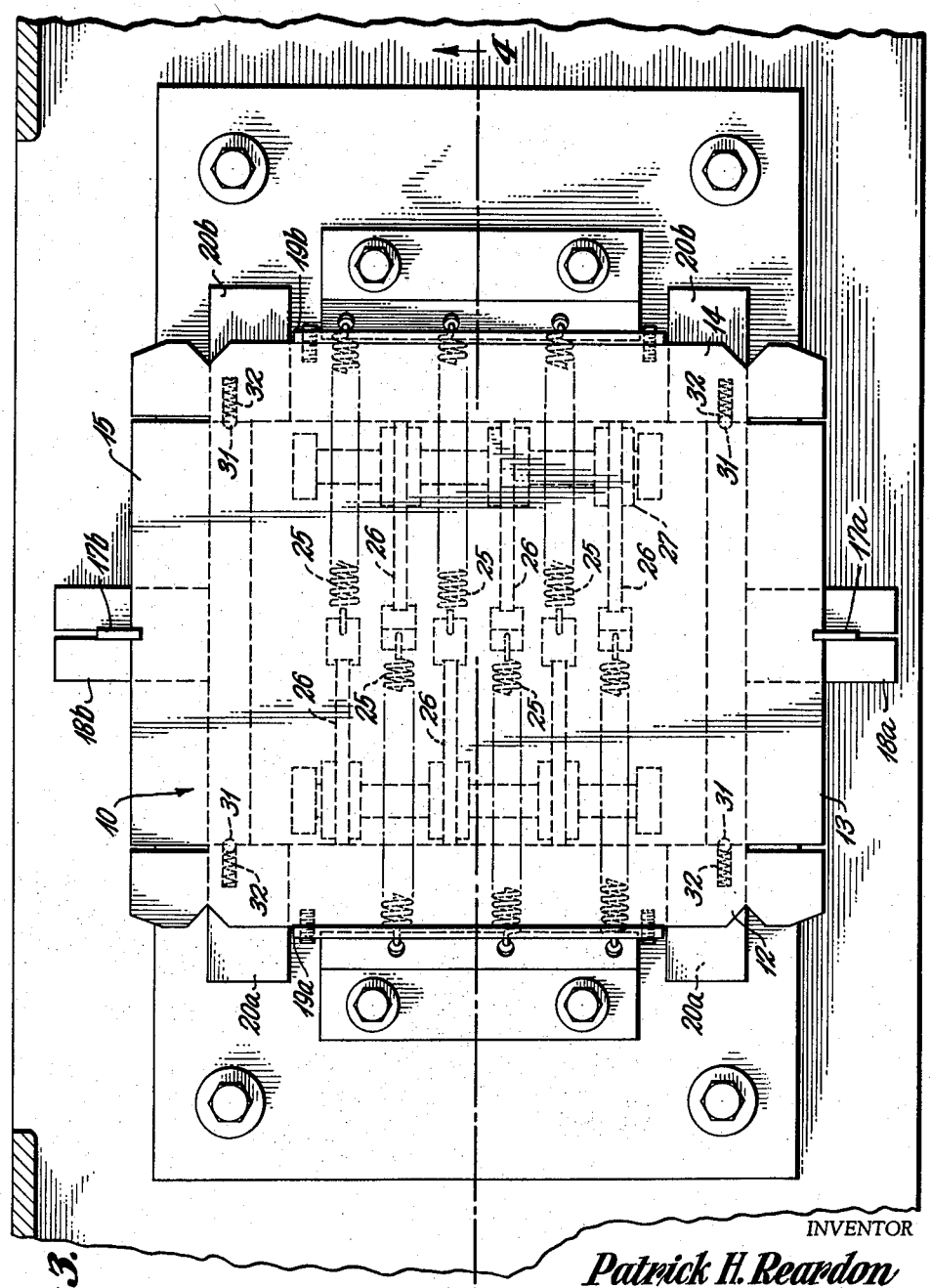

INVENTOR
*Patrick H. Reardon*

BY *Stevens, Davis, Miller & Mosher*
ATTORNEYS

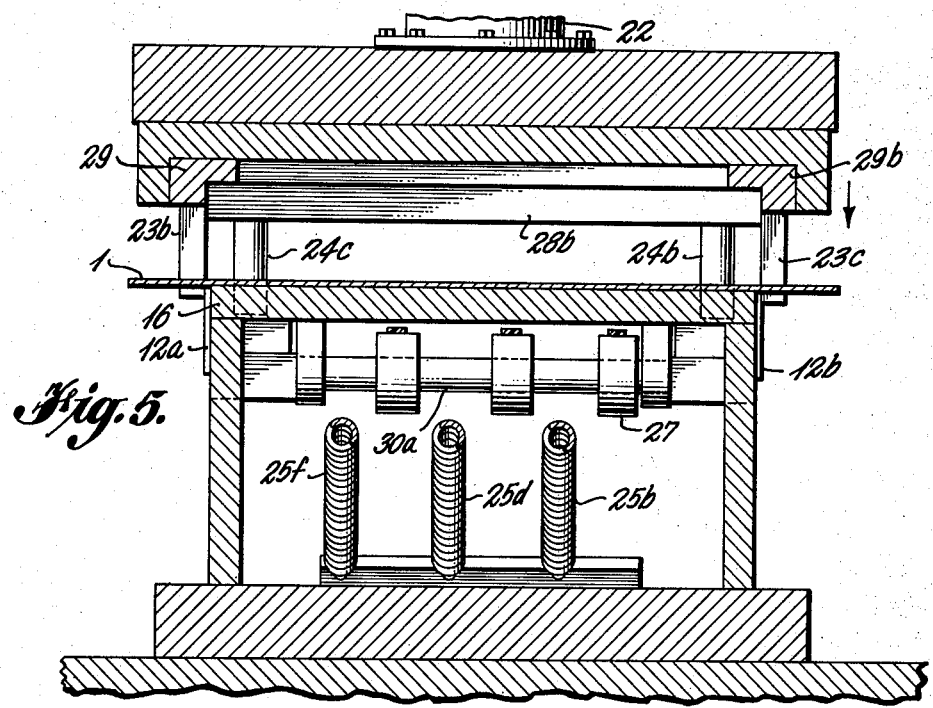
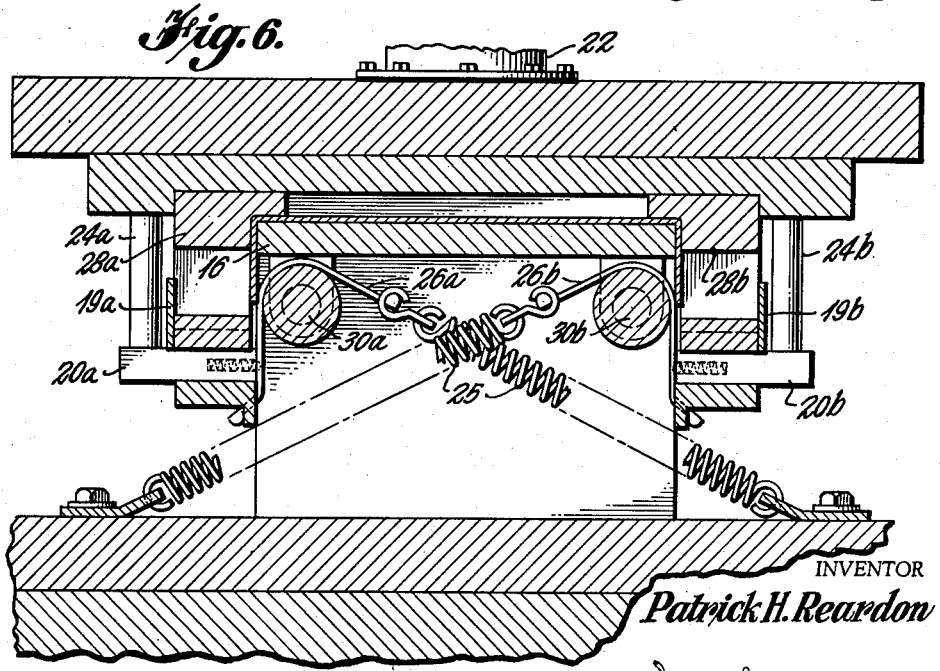

Aug. 11, 1964  P. H. REARDON  3,143,988
APPARATUS FOR MAKING ROLLED EDGE METAL CONTAINERS
Original Filed Sept. 29, 1959  7 Sheets-Sheet 5
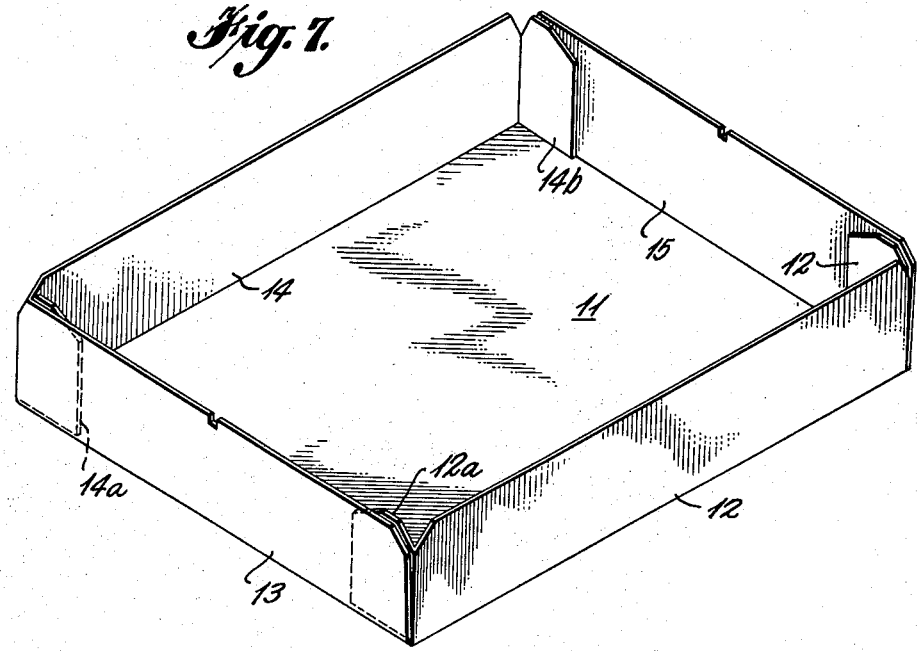
Fig. 7.
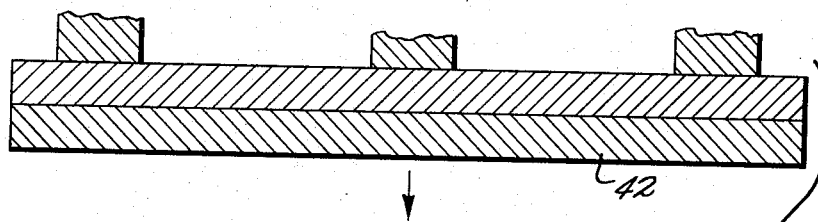
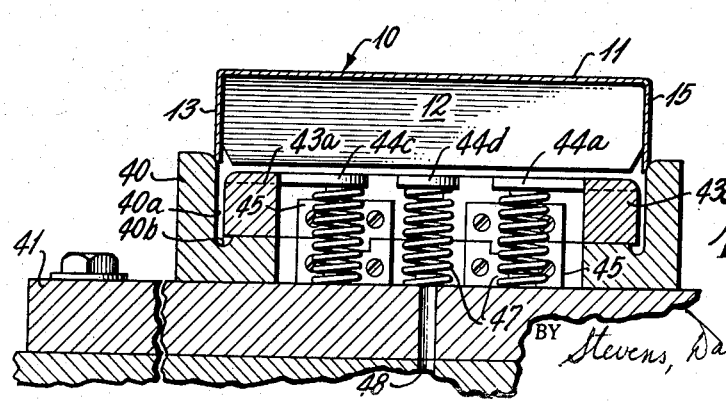
Fig. 8.
INVENTOR
Patrick H. Reardon
BY Stevens, Davis, Miller & Mosher
ATTORNEYS INVENTOR
Patrick H. Reardon
BY Stevens, Davis, Miller & Mosher
ATTORNEYS Aug. 11, 1964 P. H. REARDON 3,143,988
APPARATUS FOR MAKING ROLLED EDGE METAL CONTAINERS
Original Filed Sept. 29, 1959 7 Sheets-Sheet 7
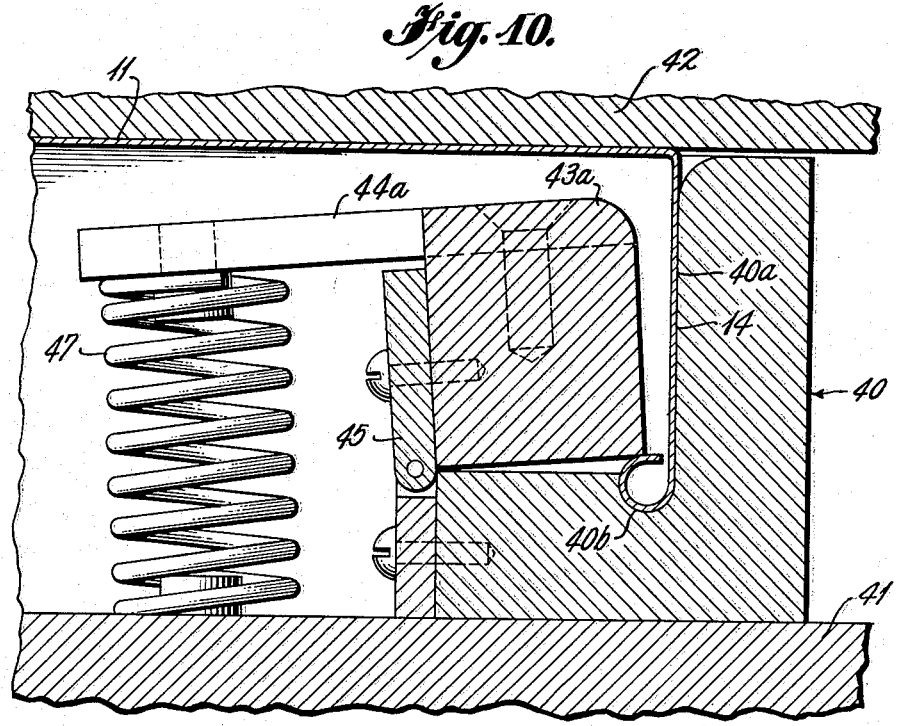
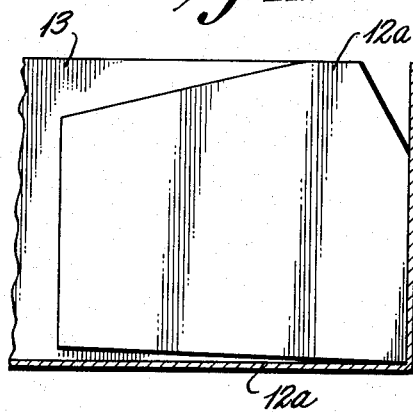
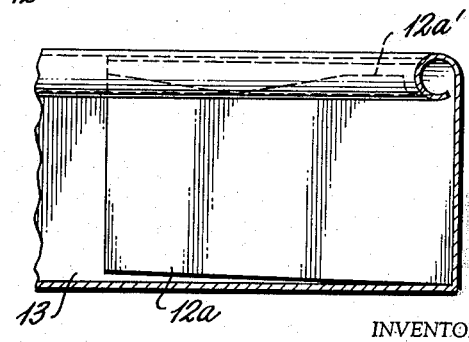
INVENTOR
*Patrick H. Reardon*
BY *Stevens, Davis, Miller & Mosher*
ATTORNEYS

United States Patent Office 3,143,988
Patented Aug. 11, 1964

3,143,988
APPARATUS FOR MAKING ROLLED EDGE
METAL CONTAINERS
Patrick H. Reardon, Hagerstown, Md., assignor, by
mesne assignments, to The Lionel Corporation
Original application Sept. 29, 1959, Ser. No. 843,220, now
Patent No. 3,019,833, dated Feb. 6, 1962. Divided
and this application June 30, 1961, Ser. No. 128,924
6 Claims. (Cl. 113—7)

The present invention relates to metal containers and to the method and apparatus for fabricating such containers. This application is a division of my copending application, Serial No. 843,220, filed Sept. 29, 1959, now patent No. 3,019,833.

A major consideration in the fabrication of all types of containers is, of course, the structural strength of the container. In the case of metal containers, the gauge or thickness of the metal used is a major factor determining the strength of the containers ultimately formed therefrom. However, for economic reasons, as well as in order to avoil excessive weight in the finished article, it is the practice to frequently make such containers from sheet metal.

At least two problems of major significance are associated with the fabrication of sheet metal containers. The first of these is that due to the thin dimension of the metal, the structural strength afforded by heavier gauge metal stock is lacking and therefore methods of design and formation of the container must be employed which will enhance the natural strength of the sheet metal.

A second problem encountered in the production of sheet metal boxes is the danger of serious lacerations which is presented to handlers of the finished article by any free edges of the thin metal which are exposed. The salability of many products packaged and shipped in metal containers, especially toys such as chemistry and scientific sets for use by children, is quite detrimentally affected by the safety hazard which exists when the edges of such containers are not bent over or blunted in any way.

A fabrication technique widely used in the prior art for the purpose of meeting both these problems consists of rolling or bending over the free edges of the metal containers, thereby enhancing the mechanical ability of the sides of the container to withstand compression forces tending to collapse them and at the same time eliminating the danger of sharp edges. It is also known to form locking tabs integral with each of two of the four sides of a metal box and to rivet or bond these tabs to the remaining two sides of the container to further enhance the structural strength of the finished product. The use of rivets, of course, results in the undesirable feature of unsightly rivet heads, and in the case of either riveting or bonding operations, extra processing and expense are involved which increase the cost of the finished product. Furthermore, rolling or curling of the free edges of sheet metal boxes has previously required at least two bending operations. Initially, the roll had to be started by slightly bending the metal in the direction the circular bend or curl was to take. Following this initial bending, the blank could then be placed in a curling die and the circular shaped bend completed.

It is the purpose of the present invention to eliminate the need for riveting or bonding in forming metal boxes with itnerlocked sides and to permit the free edges of a metal container to be rolled or curled by a simpler or less expensive operation than has previously been possible.

It is a further object of the present invention to provide a metal container having considerably improved structural strength over prior art types of containers by virtue of having positively interlocked sides which overlap each other and are rolled together into a circular configuration at their free edges.

A further object of the invention is to provide an improved apparatus and method for fabricating metal containers having rolled edges which permit the edges of the container to be rolled with a single stroke of a power press.

These and other objects of this invention will become apparent upon a further reading of the disclosure.

One aspect of the present invention comprises a four-sided metal container having locking tabs integral with and extending normally from each end of two opposing sides, which locking tabs extend along and abut the remaining two sides of the box. The upper free edges of the locking tabs are rolled together with the adjacent free edges of the sides into a circular configuration to interlock the four sides and form a substantially sturdy container.

Another aspect of the present invention comprises apparatus by which the novel method invention is carried out and includes two fact-acting machines tools of the punch press type.

In the first of these presses, a lower stationary die member is fixed to the bed of the press and consists of a forming block and guide or locating members. A reciprocating upper die member is secured to the ram of the press and carries three sets of punch members designed to act sequentially on a rectangular blank of sheet metal resting on the forming block of the lower die as the ram reciprocates downwardly. Thus, as the upper die member is brought downward, one set of the punch members initially bends the four locking tabs out of the plane of the blank and into a plane normal to the blank. Next, the second set of punch members strike the blank and bend two opposite sides of the blank which carry the locking tabs into a plane normal to the plane of the blank. Finally, toward the end of the downward stroke of the ram, a third set of punch members strike the remaining two sides of the blank, bending them into a plane normal to the original plane of the blank. With the completion of the downward stroke of the ram, the first forming operation is completed and the intermediate product formed is a rectangular shaped box having straight unrolled free edges with locking tabs projecting normally from the ends of two opposite sides of the box and abutting the two remaining sides.

In the second power press, the lower die member is basically a curling die of rectangular configuration adapted to receive the edges of the box formed in the first press. Located interiorly of the curling die are four hinged positioning members which correspond to and are substantially co-extensive with the four sides of the box to be formed. These members serve to guide the edges of the sides of the box formed in the first press into the semi-circular trough of the curling die where the edges are curled or rolled.

The upper die member of the second press is merely a flat plate fixed to the ram of the press and reciprocating therewith.

In commencing the second forming operation the box formed by the first forming operation is placed in inverted position at rest upon the lower die, with its free edges aligned with the space existing between the curling die and the adjacent hinged positioning members. The ram is then actuated and as it descends, the plate of the upper die contacts the bottom of the box and by pushing against the bottom of the box forces the edges of the sides down into the curling die. Continued downward pressure by the ram near the end of its stroke causes the edges of the sides and of the locking tabs to follow the curling die surface and thereby be rolled or formed into a circular configuration. After the ram has completed its downward stroke and is returning to its upward position, the finished rolled edge box is ejected from the curling die by pneumatic pressure injected through the lower die member into the interior of the box.

By the fabrication method of the present invention an improved metal box is constructed in which the free edges of two of the sides of the box are rolled together with the edges of locking tabs which are integral with and normal to the remaining two sides of the box. Thus, the edges of two sides and the edges of the abutting locking tabs are rolled or curled tightly together to form a positive interlock between the four sides which gives great strength to the box and prevents the sides from being pulled apart from each other and flattened or collapsed.

The invention may be better understood by referring to the following description taken in connection with the accompanying drawings in which:

FIGURE 3 is a plan view of the lower die member of the first press taken on line 3—3 of FIGURE 2;

FIGURE 5 is a section taken on line 5—5 of FIGURE 4 through the center of the first press but showing the upper die member after it has begun its descent and the leading set of punch members has struck and bent the locking tabs out of the plane of the blank;

FIGURE 6 is a view similar to FIGURE 4 but showing the upper die member fully depressed at the termination of the downward stroke of the ram;

FIGURE 7 is an isometric view of the box after it has been shaped by the first press and is ready for final bending in the second press;

FIGURE 8 is a vertical section of the second press taken on line 8—8 of FIGURE 2 showing the box of FIGURE 7 inverted and in place on the lower die member;

FIGURE 10 is a detail in section of the second press illustrating the curling die of the lower die member, one of the four hinged positioning members adjacent the curling die, and the metal box after rolling of the edge in the curling die upon depression of the upper die member;

FIGURE 11 is a detail view of a corner of a box prior to rolling the edges in the second press and drawn to full scale;

FIGURE 12 is a detail view of a portion of the finished box showing the free edges of one side and the adjacent locking tab rolled together.

Figure 1:
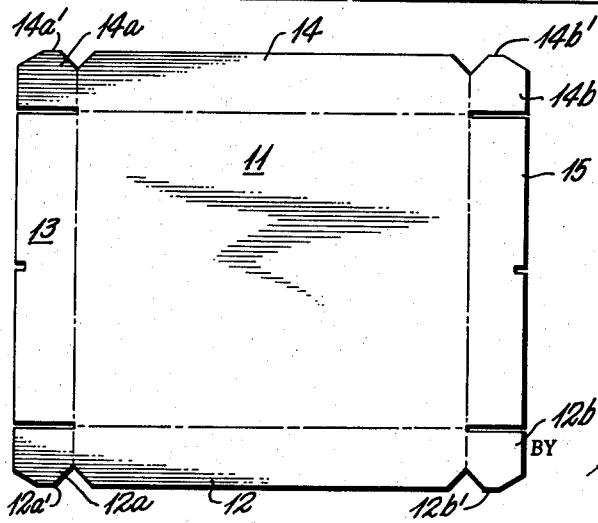
FIGURE 1 is a plan view of the flat sheet metal blank from which the boxes of the present invention are formed.

Referring now in more detail and by reference numerals to the drawings, FIGURE 1 illustrates a pre-cut flat sheet metal blank 10 used in forming the novel boxes of the present invention. That portion of the blank which will become the bottom of the box is designated by the numeral 11, and the four sides of the box are designated by numerals 12, 13, 14 and 15. Sides 12 and 14 carry at each of their ends a locking tab, these tabs being designated 12a, 12b, 14a and 14b.

Figure 2:
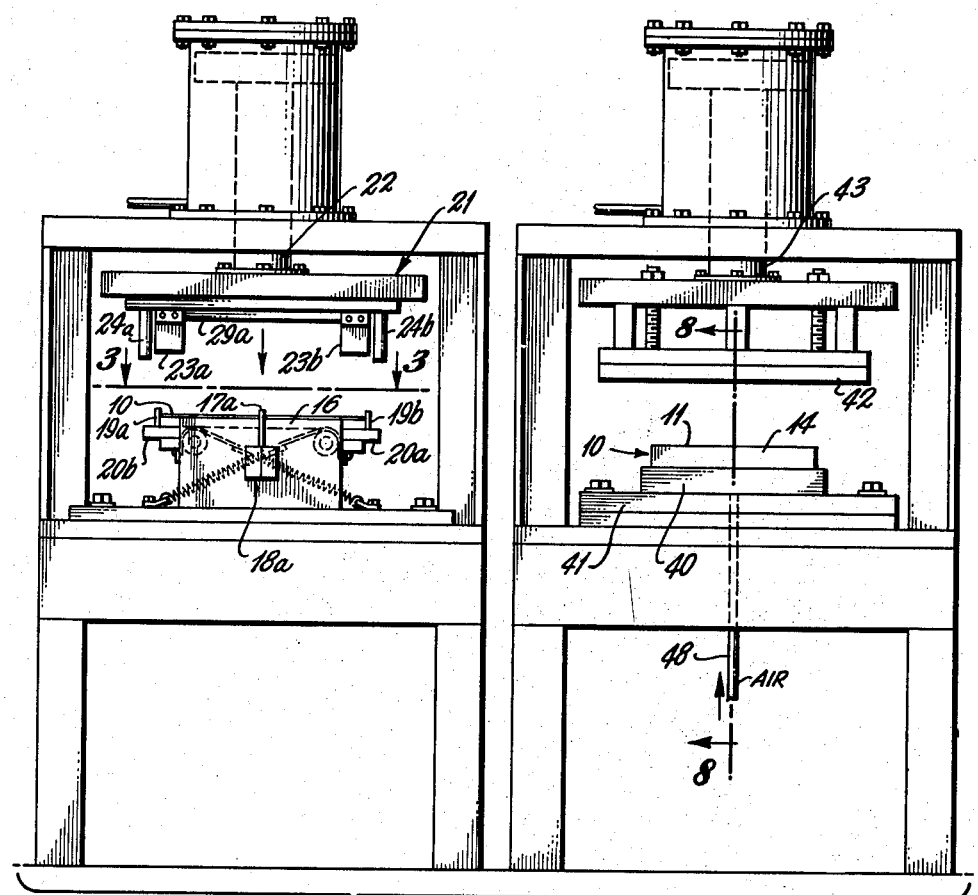
FIGURE 2 is a front elevation view of the two novel punch presses used in fabricating the metal boxes with the press initially used being depicted on the left and the press finally used being shown on the right.

FIGURE 2 depicts the two punch presses utilized in fabricating the novel box of the present invention located side by side. The first press which is employed is illustrated on the left. Affixed to the bed of the press is the lower die member which consists of a forming block 16 and two movable members 20a and 20b located at each side of the forming block. At the front and rear of the forming block are two locating blades 17a and 17b. On each side of the forming block 16 and attached to the movable members are two guide bars 19a and 19b. The function of the locating blades 17a and 17b and the guide bars 19a and 19b is to locate the sheet metal blank in correct position atop the forming block 16. Locating blades 17a and 17b are secured to the lower die member by blade supports 18a and 18b located at the front and rear of the die member, respectively. The movable members 20a and 20b of the lower die member are initially held in position near the top of the die member by six springs 25. These springs extend at an angle from the bed of the press upwardly beneath the forming block and are each connected at one end to a nylon strap 26. The nylon straps pass over rollers 27 and are secured at their other ends to the movable members 20a and 20b. The rollers 27 are all mounted on common shafts 30a and 30b with three rollers mounted on each shaft as shown in FIGURES 3 and 5. The springs 25 are under tension and exert a pull on the nylon strap which in turn holds the movable members in a position near the top of the lower die member when the press is not in use. When in this position, the upper surface of the movable members lie in the plane of, and forms a continuous surface with, the forming block 16.

In the first press a reciprocating upper die member designated generally at 21, is basically comprised of several sets of punch members. Thus, punch members 23a, 23b, 23c and 23d are the punch members which initially contact and bend the locking tabs 12a, 12b, 14a and 14b out of the plane of the blank and into a plane normal to the blank. The upper die member also carries punch members 28a and 28b which function to bend the two opposing sides of the blank which carry the locking tabs. A third set of punch members 29a and 29b strike and bend the remaining two sides of the blank at right angles to the initial plane of the blank. Projecting down from the upper die member are four plungers designated 24a, 24b, 24c and 24d which strike and depress the movable members 20a and 20b at the appropriate time during the operation of the first press. The upper die member is attached to and reciprocates with a ram 22.

The press which accomplishes the edge rolling operation is shown at the right of FIGURE 1. Resting on bed plate 41 is a lower die member. The principal component of the lower die member is a curling die 40. As depicted in FIGURE 2, the blank 10, after it has been bent by the first press, is shown resting upon the curling die 40. As seen in FIGURES 8 and 10 the curling die 40 has an inside face 40a which terminates at its bottom in a circular groove or trough 40b. The curling die 40 is in the shape of a hollow rectangle and inside the rectangle are located four positioning members 43a, 43b, 43c and 43d. Attached to the top of the positioning member are pivot plates 44a, 44b, 44c and 44d, the heels of which extend inwardly from the positioning members and rest atop compression spring 47. Each of the positioning members is attached by hinges 45 to the side of the curling die 40 which it parallels. The outside face of each positioning member is closely adjacent the inner face 40a of the curling die, being spaced therefrom only a sufficient distance to permit passage of the sides of the box. An air conduit 48 passes through the bed plate 41 of the second press and opens into the interior space between the four positioning members. The upper die member of the second press is simple of construction and consists merely of a flat plate 42 which is fixed to the ram of the press 43.

*Operation*

Having defined the various structural parts of the apparatus for forming by novel rolled edge metal box and the relationship of these parts, the operation of this apparatus and the method of fabricating the box will now be explained.

Prior to commencing the bending and forming operation, a blank 10 of the configurations shown in FIGURE 1 is cut from flat sheet metal stock. In FIGURE 1, the lines along which the blank will be folded in fabricating the box are indicated in dotted lines. The small slots intermediate the length of two of the sides of the blank are for the purpose of engaging the locating blades of the first press to insure the proper alignment of the blank upon the forming block 16. Integral with the ends of the two sides 12 and 14 opposite to those sides 13 and 15 carrying the locating slots are four locking tabs designated 12a, 12b, 14a and 14b. Since the particular configuration of these tabs is of considerable significance a brief description of them will here be made.

It will be noted that each of the locking tabs has a small portion of its width which is equal in height to the side with which it is integrally formed. This portion for convenience of expression has been designated with the symbol prime ('). From this portion of the tab the height dimension of the tab diminishes gradually along its upper free edge. It will also be noted that a V-shaped notch is cut in the blank between each locking tab and the side of the box to which it is integral. The purpose of these notches is to permit rolling of the edges without interference as will be explained in greater detail later in this disclosure.

At the commencement of the box forming process the blank depicted in FIGURE 1 is inserted in the first punch press illustrated on the left in FIGURE 1. In referring to this figure, it will be seen that the blank 10 rests flatly upon the forming block 16. This forming block is of the same dimension and co-extensive with that portion of the blank which is to become the bottom 11 of the box. The notches in sides 13 and 15 of the blank are engaged by locating blades 17a and 17b. Sides 12 and 14 of the blank rest upon the upper surface of movable members 20a and 20b, respectively with their integral locking tabs projecting outwardly over the edge of the movable members. The blank 10 is secured against lateral displacement by the guide bars 19a and 19b.

After the blank 10 has been correctly positioned atop the lower die member of the first press, the ram of the press is actuated and commences its downward stroke. As the upper die member moves downward driven by the ram 22, the locking tab punch members 23a, 23b, 23c, 23d first contact the locking tabs 12a and 12b and 14a and 14b. Under the influence of these locking tab punch members the locking tabs are bent downwardly out of the initial plane of the blank 10 and into a plane normal to the blank. After the locking tab punch members have contacted and bent the locking tabs, rigid plungers 24 affixed to the upper die member contact the cut-away portion of the movable members 20a and 20b, forcing the movable members downward against the action of the springs 25a and 25b.

It will be noted that the movable members 20a and 20b are initially maintained in their upper position prior to being struck by the plungers 24 by means of the spherical steel ball 31 and compression spring 32. (See FIGURES 3 and 4.) The ball is normally pressed partially into a slot in the forming block by the spring 32 thereby holding the movable members in their upright position. However, when the plungers 24a, 24b, 24c and 24d strike the cut-away portions of the movable members, thereby pressing them downwardly, the ball is forced out of its slot enabling the movable members to commence their downward movement. When the plungers have forced the movable members downward, the sides 12 and 14 of the blank are left unsupported. As the upper die member continues to be forced downward by the ram 22, a further set of punch members 28a and 28b which are in the shape of bars strike the sides 12 and 14 of the blank throughout their length and bend them downwardly into a plane at right angles to the original plane of the blank. Immediately following the bending of the sides 12 and 14 by punch members 28a and 28b, the remaining two sides of the blank, 13 and 15, are struck by a third set of punch members and also bent into a plane normal to the original plane of the blank. This bending of the remaining two sides of the blank occurs near the end of the downward stroke of the ram and is the final bending operation accomplished by the first press.

Figure 4:
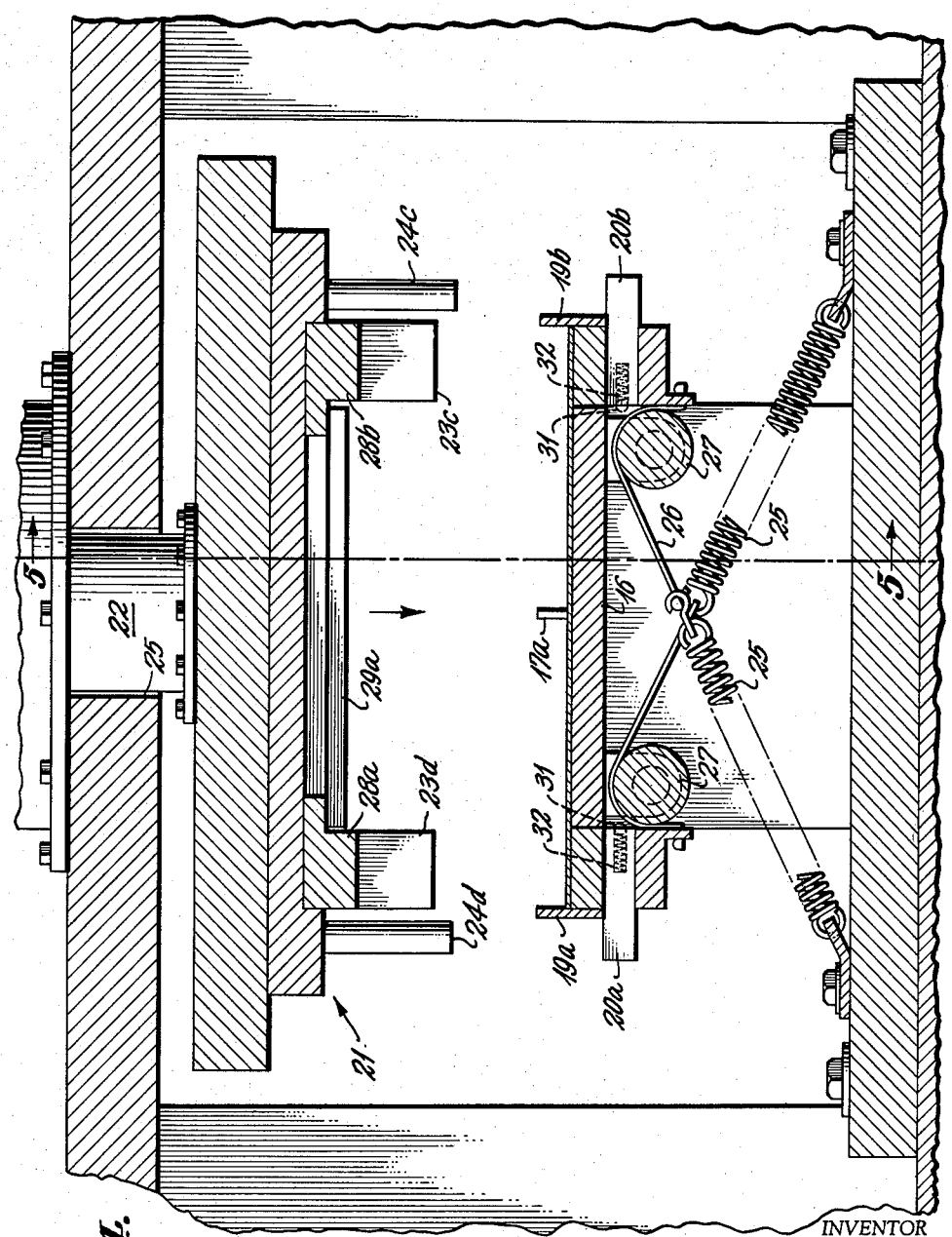
FIGURE 4 is a view in vertical section of the first press with blank inserted taken on line 4—4 of FIGURE 3 and prior to the commencement of the downward stroke of the ram.
Figure 9:
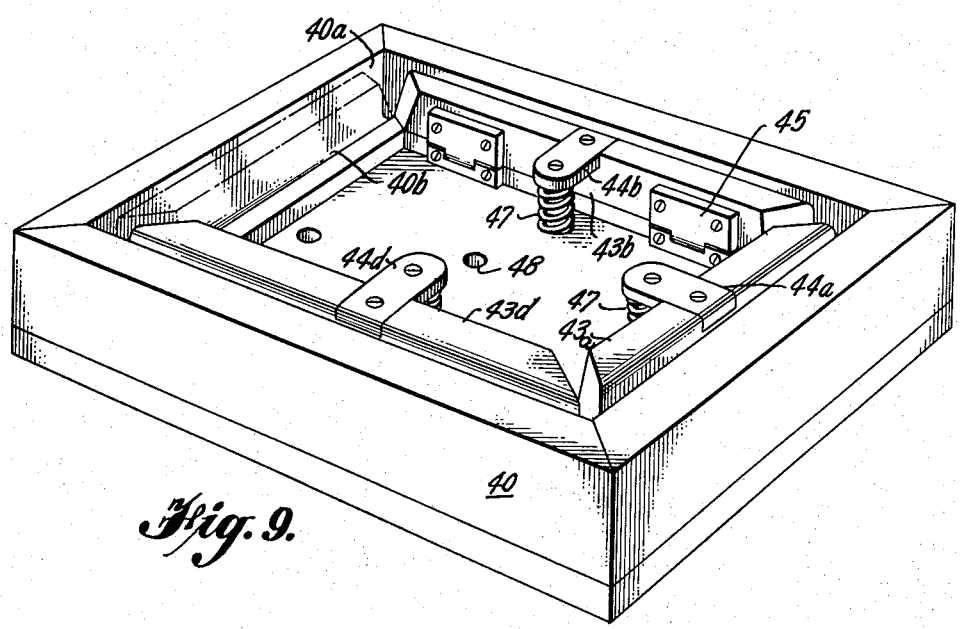
FIGURE 9 is a perspective view of the second press.

It will be observed in referring to FIGURES 3, 4 and 5 that the sequential bending of the sides and locking tabs of the blank is accomplished by virtue of the particular arrangement of the punch members. Thus, although the punch members are rigidly attached to the ram, they terminate at different distances below the ram, or conversely, above the blank. The first set of punch members 23a, 23b, 23c and 23d extends farthest below the ram and is disposed vertically above the locking tab portion of the blank so that the locking tabs are struck and bent before any other portion of the blank. The other sets of punch members terminate at lesser distances below the ram and thus strike the sides of the blank at later times. This sequential bending permits the locking tabs to ultimately be disposed inside the box which makes for a neater appearing box than if the locking tabs were outside the box.

Following completion of the bending of the blank by the first press, the upper die member and ram return to their original position allowing the movable members 20a and 20b to be returned to their upward position under the influence of springs 25. As they do so, the box as thus far formed is stripped from the forming block of the first die and may be manually removed from the press.

After the blank has been bent in the first press it appears in the form shown in FIGURE 7. The two opposite sides of the box 12 and 14 carry the locking tabs 12a, 12b, 14a and 14b, one of each of these tabs being integral with and extending from each end of the two sides 12 and 14. The tabs extend inwardly normal to the sides with which they are integral, and abut the two remaining sides 13 and 15. Attention again is drawn to the fact that for a short distance the free edge of each locking tab is in registry with the free edge of the side of the box with which they abut. These short lengths of the free edges of the locking tabs are those portions designated by the symbol 12a', 12b', 14a' and 14b'.

The blank, as a result of the forming operations accomplished in the first press, has now taken on roughly the form of the finished box and it will be seen that the rolling of the edges is the only operation yet to be completed. This is accomplished in the second press shown in the right hand portion in FIGURE 1. At the outset of the edge rolling operation, the rough box formed in the first press is inverted over the lower die member of the second press so that its free edges are in registry with the inner face 40a of the curling die 40. This position may best be observed by reference to FIGURE 8. When the box has been so located the press is actuated and the ram 43 commences its reciprocating stroke. As it moves downward the flat plate 42 of the upper die member contacts the bottom 11 of the box. As the ram continues to move downward, the sides 12, 13, 14 and 15 are pushed down into the space between the positioning members 43a, 43b, 43c and 43d and the inner face 40a of the curling die 40. The inner face of the curling die and the faces of positioning members serve to guide the sides downwardly and prevent them from buckling or collapsing. As the ram approaches the bottom of its stroke the free edges of the sides of the box reach the trough or groove 40b in the curling die and commence to bend inwardly. As the ram 43 reaches the limit of its downward movement the free edges of the box have been curled through an angle of 360° in a circular configuration. Although the bottom surface of the positioning members 43a, 43b, 43c and 43d function to some extent to direct the free edges of the box into their final circular configuration, the primary function of the positioning members is to prevent the sides of the box from buckling as their free edges encounter the groove 40b in the curling die and it is probable that the circular configuration of the box edges could be achieved without the curling influence of the lower surface of the positioning members. It is especially important to note that the locking tabs 12a, 12b, 14a and 14b are driven down between the positioning members and the inner face of the curling die along with the sides of the box by the descending plate 42, and that their free edges are simultaneously curled with the free edges of the sides of the box. As a result of this simultaneous curling of the free edges of the locking tabs and the sides of the box a tight interlock of locking tabs with their adjacent sides is accomplished as best depicted in FIGURES 13, 8 and 12.

The purpose of the cut-away portion of the upper free edges of the locking tabs will now be explained. As has been previously pointed out, the free edge of each locking tab is aligned with the free edge of its adjacent side for only a short distance represented by numerals 12a', 12b', 14a' and 14b'. For this distance the locking tabs are equal in height to the sides of the box to which they are adjacent. As the box is pressed down into the curling die the trough or groove 40b of the curling die 40 is initially contacted by the free edges of all the sides and the short edge portions 12a', 12b', 14a' and 14b' of the locking tabs. Since these portions of the locking tabs only extend for a short distance along the free edge of the adjacent sides, a considerably smaller force is required to commence the curl or bend of this double thickness of metal than would be required if the entire free edge of the locking tabs were co-extensive in registry with the free edge of the adjacent sides. By examination of FIGURE 11, it will be understood that as the box is pressed deeper into the curling die a gradually increasing extent of the free edges of the locking tabs will be forced into the trough 40b and caused to commence their curling. This will require a slightly greater force upon the bottom of the box 11 to effect the curling of both the locking tab free edge and the free edges of the sides. The function, then, of the cut-away configuration of the upper free edges of the locking tabs is to enable the curling together of both locking tabs and sides to be commenced easily with gradually increasing resistance as the simultaneous curling proceeds.

After the free edges of sides and locking tabs have been rolled through approximately 360°, a jet of air is automatically injected through the air conduit 48 into the interior of the box. This develops an effective pneumatic pressure working against the bottom of the box 11 and forces the ejection of the box from the lower die member. As the box is forced upwardly, positioning members 43a, 43b, 43c and 43d are pivoted upwardly against the force exerted by springs 47. This permits the rolled edges of the box to pass upwardly past the positioning members. After the box is ejected, the positioning members are returned to their at rest or original position under the influence of springs 47.

Figure 13:
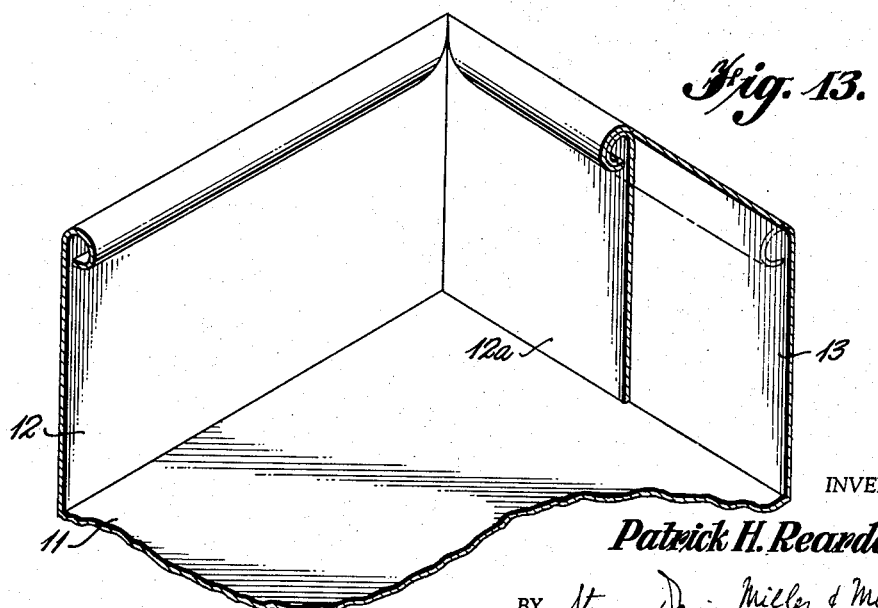
FIGURE 13 is a detail view of a corner of the finished box with the rolled edge of one side adjacent the locking tab cut away to show the interlock between side and locking tab.

A section of the finished box can be observed in FIGURE 13. It will be seen that the free edges of the locking tabs and the adjacent side have been rolled tightly together to form a positive interlock.

The metal boxes formed by the apparatus and method of this invention are free from sharp edges and therefore quite safe for handling. Additionally, a box made in accordance with the teachings of the present invention is very strong structurally. The sides cannot be pulled apart nor can they be easily collapsed under a force exerted in the vertical direction due to the reinforcing of the sides by the locking tabs which extend to the full depth of the box.

Although the frame of reference for the description of my novel apparatus and method has been the manufacture of a metal container in the form of a rectangular parallelepiped, boxes and containers of other configurations and shapes made in accordance with the teachings of the present invention and having rolled edges may be envisioned and are considered to be within the scope of this invention.

Also, the upper and lower die members of both presses as described in this invention are not limited to a particular type of power press but may be used in a variety of existing presses without significant modification of the press.

Further, although two individually powered presses are depicted in FIGURE 1, it is quite feasible and often desirable to have a common ram and single power source for actuating both presses.

It is also pointed out that by appropriate simple adjustments to the guide bars 19a and 19b and other parts of the die members, boxes with sides of varying height may be easily fabricated.

What is claimed is:

1. Apparatus for forming rolled edge metal boxes from a sheet-metal blank comprising a first press and a second press, said first press comprising a reciprocating upper die member and a lower die member, said lower die member having a forming block for supporting said blank and having vertically movable members located at two sides of said forming block, said upper die member having a plurality of staggered sets of punch members for sequentially striking and bending portions of said blank and having a set of plungers for depressing said vertically movable members, and said second press comprising a reciprocating upper die member and a fixed lower die member, said upper die member of the second press having a horizontally disposed flat plate for pushing the unfinished metal box into the lower die member and the lower die member of the second press having a rectangular curling die and having four hinged positioning members disposed inside the rectangle formed by said curling die and forming a smaller rectangle with sides parallel and adjacent to the inner face of the curling die.

2. Apparatus for making a metal box having locking tabs from a pre-cut flat blank, said apparatus comprising a reciprocating upper die member and a lower die member, said lower die member having a forming block and a vertically movable member located at each of two sides of said forming block, the upper surfaces of said movable members and said forming block lying in a common horizontal plane, said upper die member having a first set of two punch members which strike the blank last upon reciprocation of the upper die member and which bend two sides of the box, a second set of two punch members extending slightly lower than said first set for striking the blank just before said first set of punch members, a set of four plungers which strike and depress said movable members just before said second set of punch members strike said blank and as a third set of four punch members extending slightly lower than said second set of punch members which strike and bend the locking tab portions of said blank about said vertically movable member just before said plungers strike said movable members.

3. A press for forming metal boxes from a flat blank of sheet metal comprising having precut tabs at the corners thereof, a plurality of metal blocks presenting a flat horizontal surface for supporting said blank, two of said blocks disposed at two opposing sides of said surface being vertically displaceable from the plane of said surface, a series of punch members arranged in vertically staggered relation to each other disposed above said blocks, a plurality of plungers disposed above said blocks, and a vertically reciprocating member rigidly attached to said punch members and said plungers whereby when said member moves vertically downward said punch members strike and bend the tab portions of said blank and said plungers sequentially strike and depress said vertically displaceable blocks, thereby bending the sides of said blank into a plane normal to the original plane of said blank.

4. Apparatus for forming metal open-faced rectangular parallelepipeds from a flat sheet-metal blank comprising three metal blocks arranged in abutting relation to each other with their upper surface in a common horizontal plane for supporting said blank, two of said blocks disposed at two sides of said plane being vertically displaceable from said plane, a guide bar mounted on the upper surface of each of said vertically displaceable blocks along one edge thereof for aligning said blank, vertical locating blades mounted on two sides of the third of said blocks, spring means attached to each of said vertically displaceable blocks for normally maintaining the upper surfaces of said vertically displaceable blocks in said common horizontal plane with said third block, a vertically reciprocating ram disposed above the upper surfaces of said blocks, a series of sets of punch members depending from said ram and terminating varying distances therefrom, and a plurality of plungers depending from said ram and vertically aligned with said vertically displaceable blocks.

5. An apparatus as claimed in claim 4 wherein said series of sets of punch members consists of four elongated bars projecting equidistantly below said ram, a first pair of bars projecting a lesser distance below said ram than said elongated bars, and a second pair of bars projecting equidistantly below said ram but a lesser distance than said second set of bars.

6. In an apparatus for forming a rolled edge metal container from a one-piece sheet metal blank, a power press comprising a reciprocating ram, a horizontally disposed flat plate attached to said ram and reciprocating therewith, a curling die disposed beneath said plate, said die conforming generally in shape to the edges of the container which are to be rolled inwardly, said dye having an inner face, and a plurality of positioning members each having upper and lower ends, said positioning members paralleling the inner face of said curling die and spaced apart therefrom a distance slightly greater than the thickness of the metal of said box, said positioning members being hinged at their lower ends so as to swing inwardly upon withdrawal of the formed box.

References Cited in the file of this patent

UNITED STATES PATENTS

| | | |
|---|---|---|
| 249,042 | Hass | Nov. 1, 1881 |
| 321,822 | Kind | July 7, 1885 |
| 1,651,231 | Shrum | Nov. 29, 1927 |
| 2,445,548 | Wiepert | July 20, 1948 |
| 2,466,666 | Smith | Apr. 12, 1949 |